United States Patent [19]

Ross et al.

[11] Patent Number: 5,417,557
[45] Date of Patent: May 23, 1995

[54] LASER ASSISTED DEMOLDING OF OPHTHALMIC LENSES

[75] Inventors: Denwood F. Ross, Green Cove Springs; Craig W. Walker; Olin W. Calvin, both of Jacksonville, all of Fla.; Thomas G. Davis, Princeton, N.J.

[73] Assignee: Johnson & Johnson Vision Products, Inc., Jacksonville, Fla.

[21] Appl. No.: 207,443

[22] Filed: Mar. 7, 1994

Related U.S. Application Data

[62] Division of Ser. No. 947,218, Sep. 18, 1992, Pat. No. 5,294,379.

[51] Int. Cl.$^6$ ............................................ B29D 11/00
[52] U.S. Cl. .......................... 425/143; 425/174.4; 425/436 R; 425/440; 425/808; 264/334
[58] Field of Search ........ 425/174.4, 436 R, 436 RM, 425/440, 808, 143; 264/334

[56] References Cited

U.S. PATENT DOCUMENTS

| | | | |
|---|---|---|---|
| 3,938,775 | 2/1976 | Sarofeen | 264/1.4 |
| 4,382,902 | 5/1983 | Feurer | 264/1.4 |
| 4,390,482 | 6/1983 | Feurer | 264/1.4 |
| 4,568,262 | 2/1986 | Feurer | 264/1.4 |
| 4,652,721 | 3/1987 | Miller et al. | 264/1.4 |
| 4,728,469 | 3/1988 | Danner et al. | 264/1.4 |
| 5,160,749 | 11/1992 | Fogarty | 264/2.3 |

Primary Examiner—James P. Mackey

[57] ABSTRACT

Described is an apparatus and method for removing a molded ophthalmic lens from between the mold portions in which it is produced. A source of intense electromagnetic radiation, preferably a carbon dioxide ($CO_2$) laser of about 80 Watts at a wavelength of 10.6 $\mu m$, is applied to at least one of the mold portions. The exposure of the mold portion to the laser is between one half and one second. Differential expansion of the heated mold polymer relative to the cooler polymer shifts one surface with respect to the other, and the shear force breaks the polymerized lens/polymer mold adhesion and assists in the separation of mold portions. The greater the temperature gradient between the surfaces of the mold portions, the greater the shearing force and the easier the mold portions separate. The heated back mold portion is promptly removed so that very little energy is transferred to the polymer lens, avoiding the possibility of thermal decomposition of the lens.

4 Claims, 5 Drawing Sheets

LASER ASSISTED DEMOLDING OF OPHTHALMIC LENSES

This is a division of application Ser. No. 07/947,218, filed Sep. 18, 1992, now U.S. Pat. No. 5,294,379, which is hereby incorporated by reference.

BACKGROUND OF THE INVENTION

This invention relates to a method and apparatus for the improved removal of molded ophthalmic lenses from the mold in which they are produced. In particular, this invention is suited to molded ophthalmic lenses such as hydrogel contact lenses, although the method is also suitable for other small, high-precision ophthalmic lenses such as intraocular lenses.

As the ophthalmic lens industry has grown, and in particular the industry related to supplying contact lenses that are provided for periodic frequent replacement, the number of lenses that need to be produced has increased dramatically. This has required manufacturers to strive for methods and apparatus that can be adapted to automated practices and perform with consistency.

It is known in the art to make ophthalmic lenses such as soft contact lenses, by forming a monomer or monomer mixture in a mold such as one made from polystyrene or polypropylene.

Examples of this art can be found in U.S. Pat. Nos. 5,039,459, 4,889,664 and 4,565,348. Discussed therein is the requirement for a polystyrene mold that the materials, chemistry and processes be controlled so that the mold portions do not require undue force to separate by sticking to the lens or to each other.

In contrast to the above polystyrene molds, another example is the use of polypropylene or polyethylene molds such as that described in U.S. Pat. No. 4,121,896.

A particular problem is that the mold portions usually are surrounded by a flange, and the monomer or monomer mixture is supplied in excess to the concave mold portion prior to the mating of the molds. After the mold portions are placed together, defining the lens and forming an edge, the excess monomer or monomer mixture is expelled from the mold cavity and rests on or between the flange of one or both mold portions.

Upon polymerization this excess material forms an annular flange or ring around the formed lens.

The prior art process for separating the mold portions and removing the lens consists of preheating, heating, prying and removal. Hot air provides the heating, mechanical leverage the prying, and the removal is manual. Heating the mold by convection is not an efficient heat transfer technique. From the time a mold enters the heating apparatus until the back mold portion is completely removed requires on the order of one minute.

The present method for removing the lens is to apply heat to the back mold portion by means of a heated air stream. The heating of the back mold portion is done in two steps: a preheat stage and a heat/pry stage. In the heat/pry stage the mold is clamped in place and pry fingers are inserted under the back mold portion. A force is applied to each back mold portion during a heating cycle.

When the required temperature has been reached, the back mold portion breaks free and one end is lifted by the pry fingers. After the back mold portion has been detached from the front mold portion on at least one side, the mold then exits the heater. The back mold portion and the annular flashing is then totally removed.

It is also possible to impinge hot or cold air on the outer surface of the front mold portion, to achieve other thermal gradients. The heated air is blown on the exterior of the back mold portion where it transfers heat to the upper surface of the lens. Heat is transported through the back mold, the molded lens, and front mold by thermal diffusion.

While the aforementioned method has some efficacy in assisting the removal of the lens between the mold portions, the temperature gradient achieved from the heated back mold portion, across the lens to the front mold portion is relatively small. The shortcomings in this approach result from the way heat is delivered to the mold portion. The constant temperature air stream heats the exterior surface of the back mold portion more rapidly, while thermal conduction transfers heat to the lens surface. The only way to increase the thermal gradient is to transfer heat faster, but this would cause the back mold portion to become too soft for the lift fingers to engage.

As stated above, this method has not been entirely satisfactory because the thermal gradient induced is not sufficient to fully and repeatedly separate the mold portions.

It is, therefore, an object of the present invention to provide a method and apparatus that can easily and repeatably separate the mold portions without damaging the lens.

It is another object of the invention to perform such separation without excessive environmental heating or waste of energy.

It is a further object of the present invention to provide a method and apparatus whereby a high temperature gradient can be applied across at least one of the mold portions.

These and other objects are attained by the present invention described as follows.

SUMMARY OF THE INVENTION

The above objectives are attained by use of a source of electromagnetic radiation, preferably a carbon dioxide ($CO_2$) laser, applied to at least one of the mold portions. The laser is preferably of about 80 Watts at a wavelength of 10.6 $\mu$m. The exposure of the mold portion to the laser is between one half and one second.

Because differential expansion of the heated mold polymer relative to the cooler lens polymer shifts one surface with respect to the other, the shear force breaks the polymerized lens/polymer mold adhesion and assists in the separation of mold portions. The greater the temperature gradient between the surfaces of the mold portions, the greater the shearing force and the easier the mold portions separate. This effect is greatest when there is maximum thermal gradient. As time continues, heat is lost through conduction from the back mold portion into the lens polymer and the front mold portion, and then collectively into the surrounding environment. The heated back mold portion is, therefore, promptly removed so that very little energy is transferred to the polymer lens, avoiding the possibility of thermal decomposition of the lens.

DESCRIPTION OF THE PREFERRED EMBODIMENT

Using a Synrad C48-1 waveguide pumped $CO_2$ laser (available from Synrad, Inc., Bothell, Wash.) which has maximum output power of 10 Watts at 10.6 μm, 3 to 4 Watts applied to the back mold portion of a lens/mold combination was sufficient to cause heating of a polystyrene mold portion so that the mold can be mechanically separated. It was found that release temperatures could easily be achieved in 10 to 12 seconds and separation of the mold portions using mechanical pry fingers accomplished.

While a $CO_2$ laser, producing radiation in the mid-infrared range at a wavelength of 10.6 microns was used, it is also be possible to use a high powered UV laser or a high intensity electromagnetic radiation emitter of any type where the radiation produced is absorbed by the mold material sufficiently to cause an increase in mold material temperature.

Lasers are typically the most intense sources available, and hence, maximize the efficiency of energy transfer from source to workpiece. "Intense" refers not to the total output of the source, but rather the concentration of its energy. Other intense electromagnetic energy sources capable of heating with efficiency and rapidity, such as microwave generators, can be used. The characteristic shared by these sources, defined as intense, is that the area covered by the output at the distance to the workpiece is on the order of the area of the workpiece. Clearly, convective heating with hot air such as the prior art described in the Background section would not be intense because of its wide dispersion.

In the case of lasers, both mid-infrared and UV, the laser energy is nearly 100% efficient because the polystyrene mold material is nearly 100% absorptive and only a tiny fraction of the incident radiation is reflected or scattered. In this way there is little or no energy lost to atmospheric absorption, so only the sample is heated.

Figure 1:
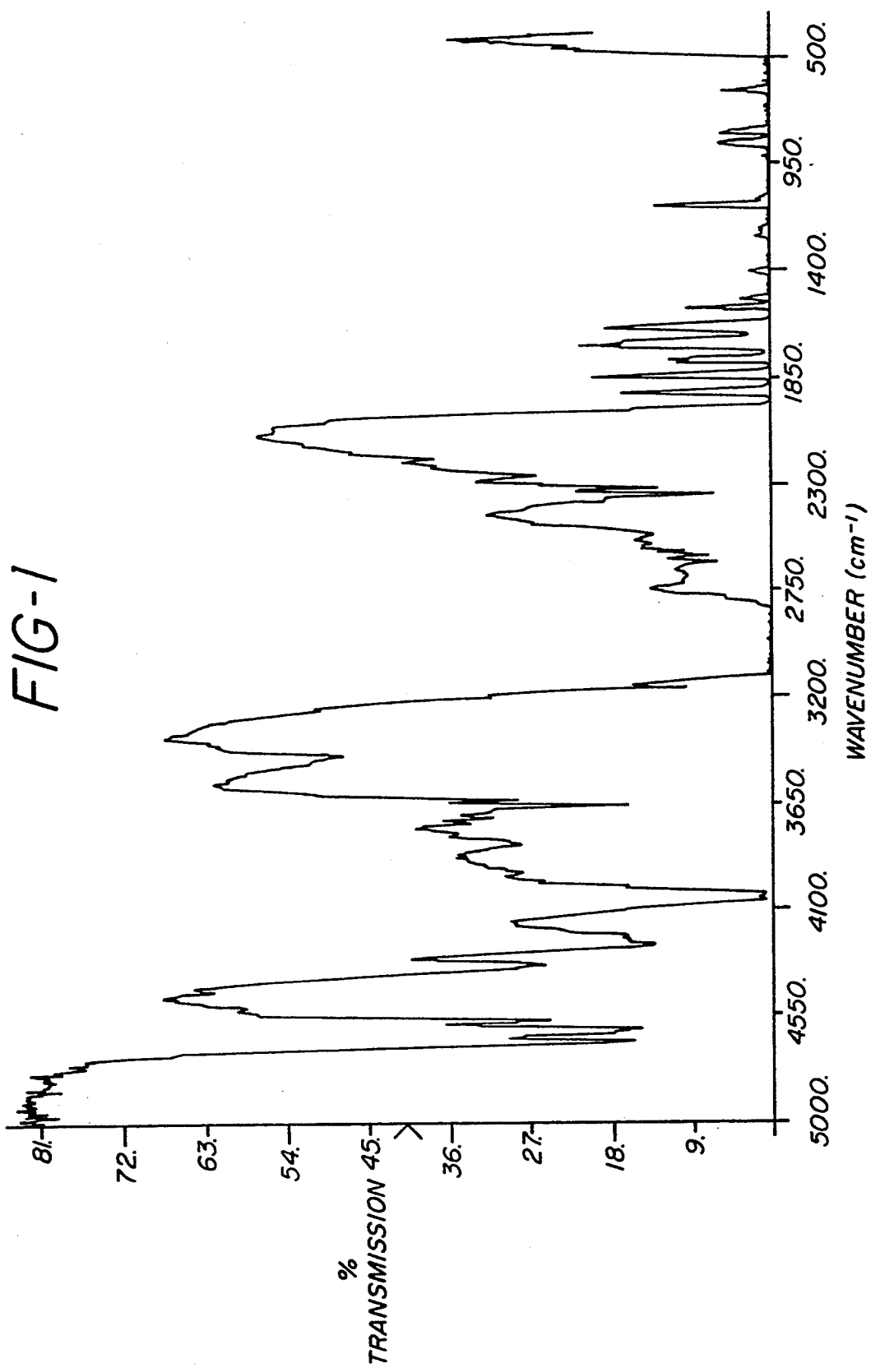
FIG. 1 is a graph of the radiation transmission of polystyrene as a function of wavenumber in the infrared zone.

The absorption of radiation by a 1 mm polystyrene plate in the infrared spectrum is shown in FIG. 1. For the $CO_2$ laser described above, the 10.6 micron wavelength of the radiation produced has a corresponding (reciprocal) wavenumber of 943.3 $cm^{-1}$.

Also, because of the absorptive nature of the mold material at these frequencies, most of the laser energy is absorbed within several wavelengths travel into the material. From that point, heat is transferred only by conduction from the surface. For that reason, on initial exposure to the laser beam, a huge thermal gradient is formed between the exposed exterior surface and the surface of the mold portion in contact with the lens.

With a Laser Photonics 7.5 Watt RF wave-guide pumped $CO_2$ laser (available from Laser Photonics, Inc., Orlando, Fla.), tests were performed where the output was diverged so to irradiate each mold cavity completely and fairly uniformly. Increased exposure time determined that while the back portion of the mold could be removed mechanically in approximately 12 seconds, that increasing the exposure time to 18 seconds loosened the back mold portion sufficiently, yet nondestructively, so that it separated with no mechanical removal.

The preferred embodiment was found by experimentation. While it has been found that a laser power output of 3 to 4 Watts is sufficient to cause heating of a polystyrene mold portion so that the mold can be mechanically separated, it was determined that a much higher powered laser, up to 500 Watts, is preferred as an embodiment. Increasing the laser power and decreasing the exposure duration was found to increase the thermal gradient and increase the ease and consistency with which the mold portions could be separated.

A 500 Watt Coherent General $CO_2$ laser (available from Coherent General, Inc., Sturbridge, Mass.) was employed, and it was determined that optimal results were obtained by applying continuous power levels from about 20 Watts to about 80 Watts total to the mold/lens combination.

The preferred exposure time for these power levels was found to between about 0.4 to about 1.2 seconds. This results in an optimum energy supplied of 0.4 $W/cm^2$ for 0.5 seconds equal to 0.2 $Joules/cm^2$.

It was found that if a lens/mold combination was sufficiently underexposed the result would be a combination where separation forces would still be high. Lens damage such as tearing and mold damage such as breaking would result.

If a lens/mold combination was overexposed to the laser energy separation mold portions and removal of the lens would again be difficult. Mold damage would result such as oxidizing and melting (softening), and loss of mold rigidity would frustrate mold separation. In addition, overexposure thermally degrades the lens.

With this determination made, further tests were conducted using a Laser Photonics model 580 CW/pulse 80 Watt laser.

Lasers of about 80 Watts are available both in flowing gas and sealed laser types. The Laser Photonics laser was integrated with an optical train shown in FIG. 2.

Figure 2:
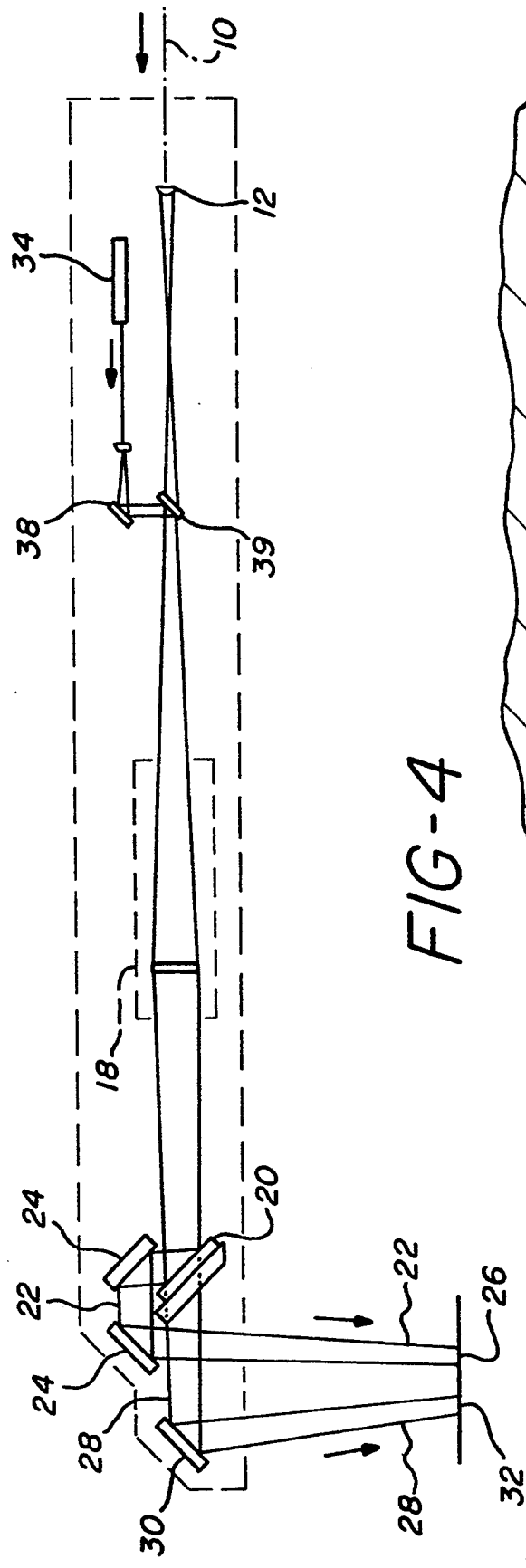
FIG. 2 is a schematic diagram of the optical train of the present invention.

As is readily appreciated by one skilled in the art, zinc selenide is an appropriate material for construction of the lenses and other optical components in an optical train using laser light of the above specified wavelength. Referring to FIG. 2, the input beam 10 is generated by laser not shown. The beam first travels through a plano convex lens 12 which causes the laser beam to converge.

As the beam further diverges it encounters integrator 18 which serves as an internal diffuser. The diffuser serves to scatter the laser light internally and provide for a more uniform beam. The beam as originally produced by the laser is typically not consistent across the beam in power distribution. Without a diffuser, this could lead to hot and cold spots on the incident object if a integrator is not used.

As described above, undesirable characteristics result from under- and overexposure of the lens/mold combination to the laser energy. If the energy is non-uniform across the beam, both effects can be found on the same mold. Because a typical laser beam has a two dimensional Gaussian distribution of energy across the beam, the diffuser is necessary to square off the energy distribution. It is postulated, however, that annular or "doughnut" structured beams would provide adequate results by supplying energy to the part of the mold adjacent the excess polymer ring 45 outside the cavity of the mold that forms the lens.

After emerging from integrator 18, the beam is now uniform and weakly converging, and is made to be incident upon a beam splitter 20. The beam splitter passes half of the beam energy through the splitter and reflects the other half. The half of the beam 22 reflected by splitter 20 is reflected by mirrors 24 ultimately causing the beam to strike one lens/mold combination 26. The other half of the beam 28 split by beam splitter 20, strikes mirror 30 and is reflected to the other lens/mold combination 32.

In this preferred embodiment two mated mold portions containing a polymerized lens therebetween can be simultaneously heated by means of the apparatus.

Note that in this instance, the laser utilized is between 150 and 200 Watts so that the laser power incident upon the mold pieces is the preferred, approximate 80 Watts.

Also shown in this arrangement is a helium-neon alignment laser 34 used to assure proper alignment of the optics in the system. The helium neon laser 34 produces a beam which is reflected by mirror 38 toward the path used by the main laser beam 10. At the intersection of the alignment laser beam with the path of the main laser beam, the alignment laser beam encounters beam splitter 39 which places the alignment laser beam in the same path as the main laser beam.

Figure 3A:
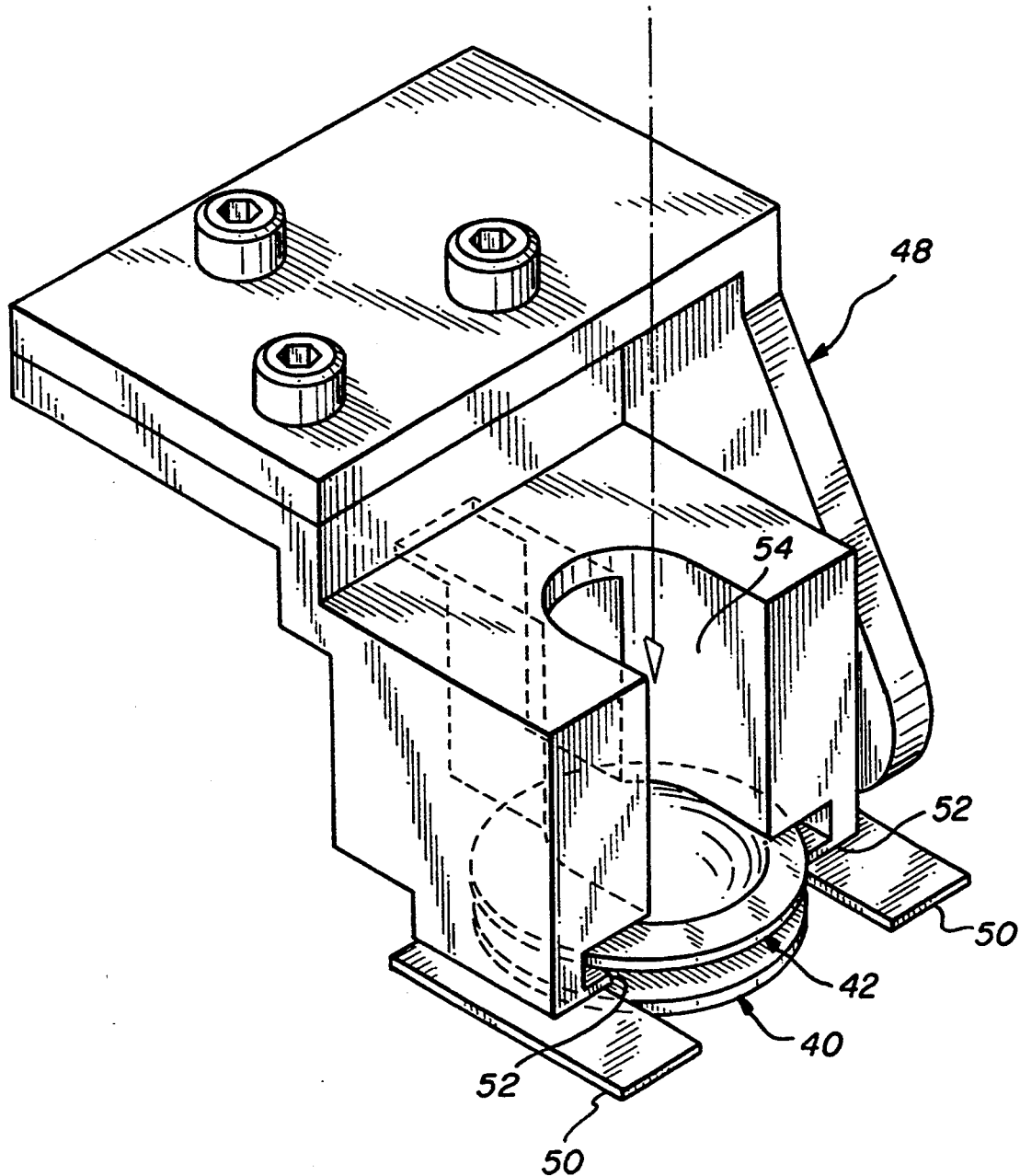
FIG. 3a is an isometric view of a fixture apparatus for separating mold portions according to one aspect of the present invention.
Figure 3B:
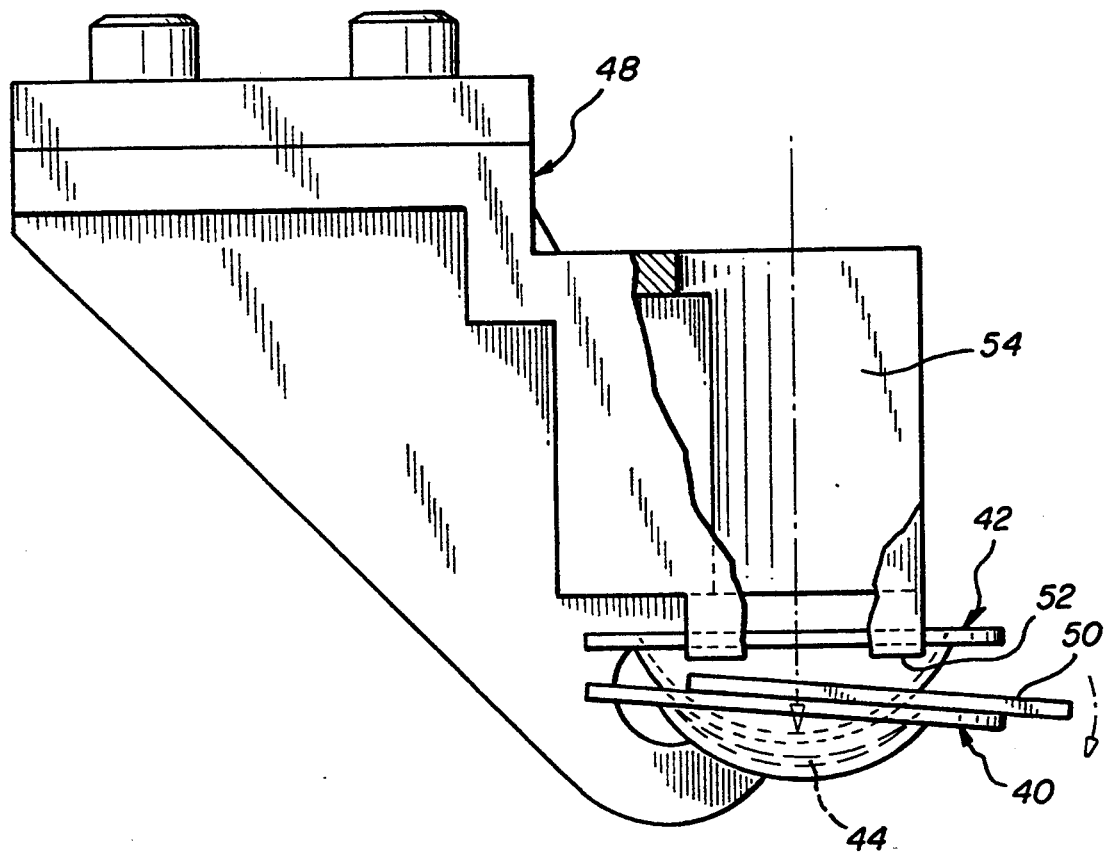
FIG. 3b is a side elevational view of the apparatus of FIG. 3a, in the position after the mold portions have been separated.

The lens/mold combination is positioned in a conventional manner by holding one or both mold portions (with the lens therebetween) in a fixture shown in FIGS. 3a and 3b. The primary requirement of this fixture, beyond mechanical stability, is not to interfere with the beam of electromagnetic radiation. This is the reason it is preferred to hold the lens/mold combination by only the first mold portion and irradiate the second mold portion.

Shown in FIGS. 3a and 3b are a lens/mold combination identified in FIG. 2 as elements 26 and 32, and holding fixture 48. This lens/mold combination is comprised of front mold portion 40 and back mold portion 42 with lens 44 therebetween, as identified in FIG. 4.

For the presently described system, only the back mold portion is heated by exposure to radiation. The back mold portion is thinner and allows rapid, non-destructive heating of the polystyrene sufficient to build a large thermal gradient. The thicker front mold portion containing a larger amount of polystyrene would not be heated as rapidly and thereby not produce the same thermal gradient without localized overheating problems.

For this reason, referring to FIG. 3a, the hold down 50 and finger 52 are placed between the front mold portion 40 and back mold portion 42. As the lens/mold combination is held the laser energy is directed through the channel 54 in fixture 48 and onto the back mold portion 42.

Heating both mold portions would be possible, but would not produce any advantages over heating of the back portion only.

Figure 4:
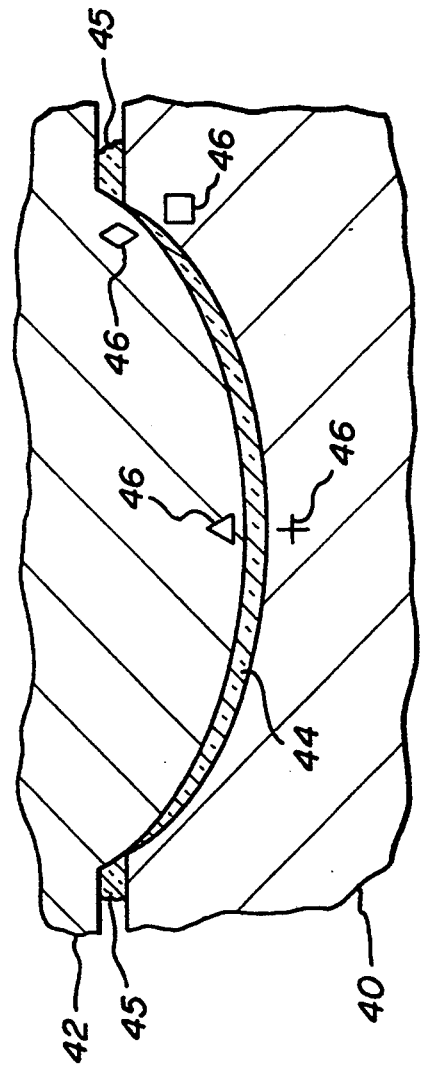
FIG. 4 is a cross sectional view of a molded ophthalmic lens contained between two mold portions showing thermocouple locations.

Turning now to FIG. 4, there is shown in cross section a pair of mated mold portions with a lens therebetween. The mold portions are comprised of a front portion 40 and a back portion 42. Between these two mold portions is lens 44 and an excess polymer ring 45 outside the cavity of the mold that forms the lens. Shown symbolically, are locations of thermocouples 46.

Figure 5:
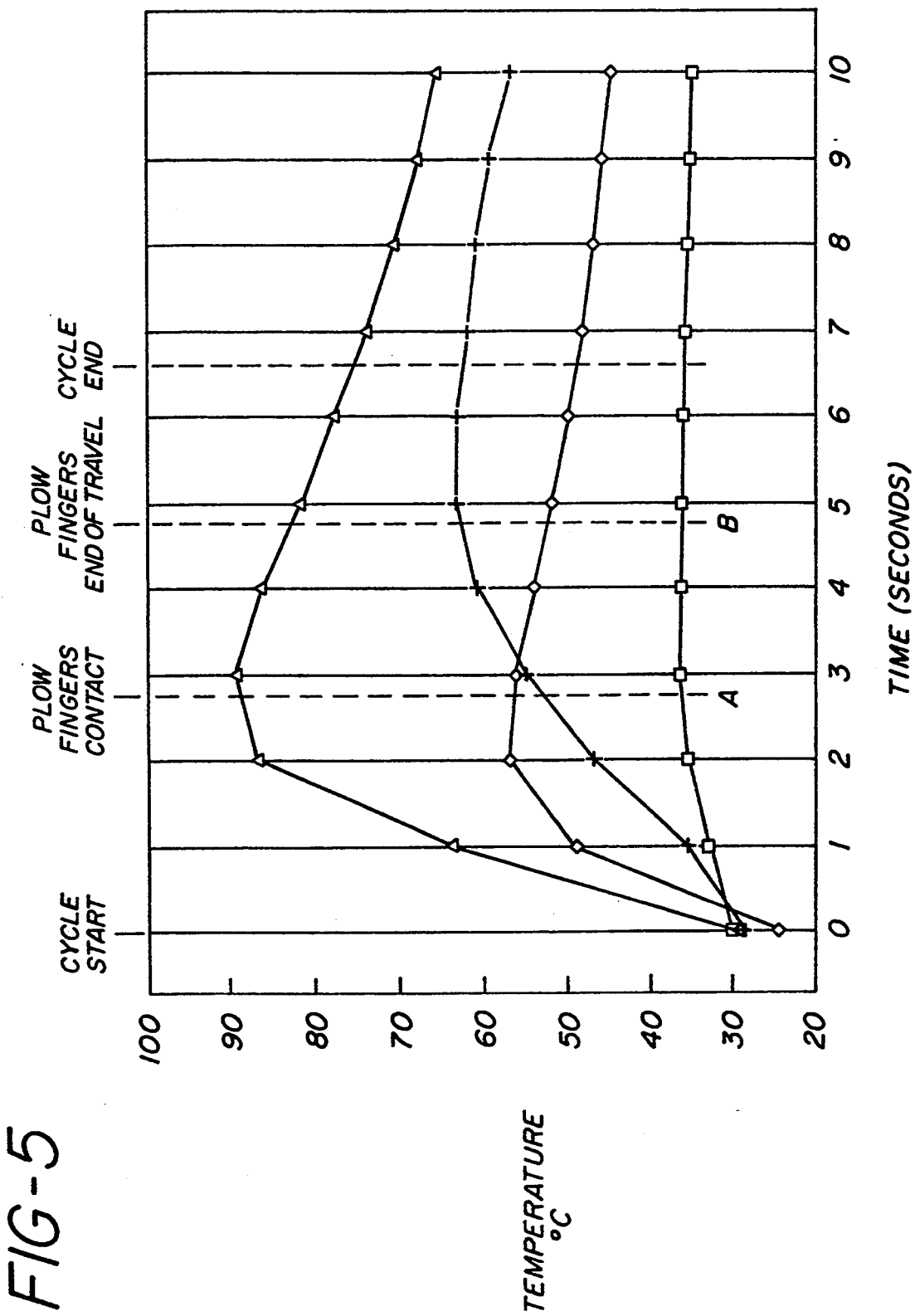
FIG. 5 is a graph showing, as a function of time, the temperature profile of the work piece shown in FIG. 4 at the corresponding thermocouple locations.

Turning now to FIG. 5, there is shown a graph of temperature at the like-indicated thermocouple locations as a function of time.

As can be determined from the graph, at $t=0$, the start of the demolding cycle, the temperature at the thermocouple locations is slightly above ambient, the temperature at which the mold is discharged from the curing process.

At time equals 0 seconds, the laser beam strikes the laser back mold portion surface and quickly heats the entire back portion of the mold excluding the flange. The temperature continues to increase for approximately 2 seconds. At about $t=2\frac{3}{4}$ seconds, mechanical removal of the back mold portion from the front mold portion begins, designated here as point A, and continues for approximately 2 seconds until point B at about $t=4\frac{3}{4}$ seconds when the back mold portion surface has been completely removed from the front mold portion.

As can be seen, the temperature difference between identical locations on the front and back mold portions can be as much as 35° Centigrade, greatly facilitating the removal of the back mold portion from the front mold portion and the lens. Prior art methods of heating the back mold portion by using a heated fluid resulted in a temperature difference of approximately 3° to 5° C. and required on the order of one half to one and one half minutes to achieve the maximum temperature difference.

It was found that the preferred method for removing the back mold portion from the front mold portion after heating the back mold portion with the laser, was to apply a relative tensile force between the mold portions. Referring to FIG. 3b, the thin metal fingers 52 which are located underneath the back mold portion flange 42, are machined flat on both sides. The upper part of the fixture 48 is capable of rotation about axis 56 so that after exposure of the mold portion 42 to the laser, the fingers 52 pry the back mold portion up. Whereas it was found that merely prying off the back mold portion in an arbitrary fashion was acceptable, when the metal fingers were allowed to stop under the flange, and then tilted back, the overall quality of the lens removed was as good or better than currently employed techniques.

It was determined that such above-described mechanical assistance was best supplied less than 0.3 seconds after exposure to the radiation. Although no adverse effects would be contemplated if there was less time between exposure and mechanical removal, in practical terms the time between exposure and mold separation would be between about 0.2 and about 1.5 seconds. Beyond a delay of 1.5 seconds the difficulties in mold separation and lens removal would be the same as those resulting from underexposure, as described above.

A significant quality consideration and advantage of the present invention is the consistent retention of the lens in the front mold portion when the back mold portion is laser heated and removed in accordance with the above technique.

As can be expected, an increase in lens defects correlates with the occurrence of high energy areas or "hot spots" in the beam profile. This is expected because overheating in one area weakens the lens, making it prone to tearing, chipping or being pulled away from the front mold portion surface.

With the optimal exposure time and appropriate demolding mechanism, such as wedge shaped fingers employed to rock the back mold portion, the mold portions can be separated and the lens can be removed from the mold in approximately 5 seconds.

The above is by way of example for the preferred polystyrene mold system, and as can be readily appreciated by one in the art, the radiation wavelengths, power levels, and exposure times must be appropriately adjusted according to the above considerations to achieve optimal characteristics for other lens/mold material systems.

We claim:

1. An apparatus for separating the portions of a mold comprised of at least two mold portions, a first mold portion and a second mold portion, containing therein an ophthalmic lens, said apparatus comprising:

means for positioning the mold portions containing the ophthalmic lens therebetween by holding either or both mold portions in a fixture, a source of intense electromagnetic radiation for which the material of at least one of the mold portions is absorptive sufficient to cause an increase in temperature of said material, means for directing said radiation from said source to impinge the outer surface of either one or both of said mold portions, means for controlling the duration of said intense radiation impingement upon the mold portions to cause during said duration of radiation impingement, a rise in the temperature of the mold portion so impinged by the radiation from said source.

2. The apparatus of claim 1 wherein the source of intense electromagnetic radiation is a laser.

3. The apparatus of claim 1 wherein the radiation has a wavelength of between about 1 $\mu$m and about 20 $\mu$m.

4. The apparatus of claim 1 wherein said means for positioning holds said first mold portion, thereby holding the second mold portion and the lens attached thereto, and the source of radiation is directed to impinge the outer surface of said second mold portion.

* * * * *